M. K. LEWIS.
ATTACHMENT FOR STEERING WHEELS.
APPLICATION FILED MAR. 15, 1917.

1,247,425.                                           Patented Nov. 20, 1917.

WITNESSES

INVENTOR
MILES K. LEWIS,
BY
ATTORNEYS

UNITED STATES PATENT OFFICE.

MILES KARL LEWIS, OF LOMPOC, CALIFORNIA.

ATTACHMENT FOR STEERING-WHEELS.

1,247,425.

Specification of Letters Patent. Patented Nov. 20, 1917.

Application filed March 15, 1917. Serial No. 154,976.

*To all whom it may concern:*

Be it known that I, MILES K. LEWIS, a citizen of the United States, and a resident of Lompoc, in the county of Santa Barbara and State of California, have invented an Improvement in Attachments for Steering-Wheels, of which the following is a specification.

My invention is an improvement in tractor attachments, and has for its object to provide mechanism for use in connection with tractors of any character, for permitting the vehicle to be controlled from a point outside the same, as, for instance, by a driver in another vehicle running alongside or behind or in front.

Figure 1:
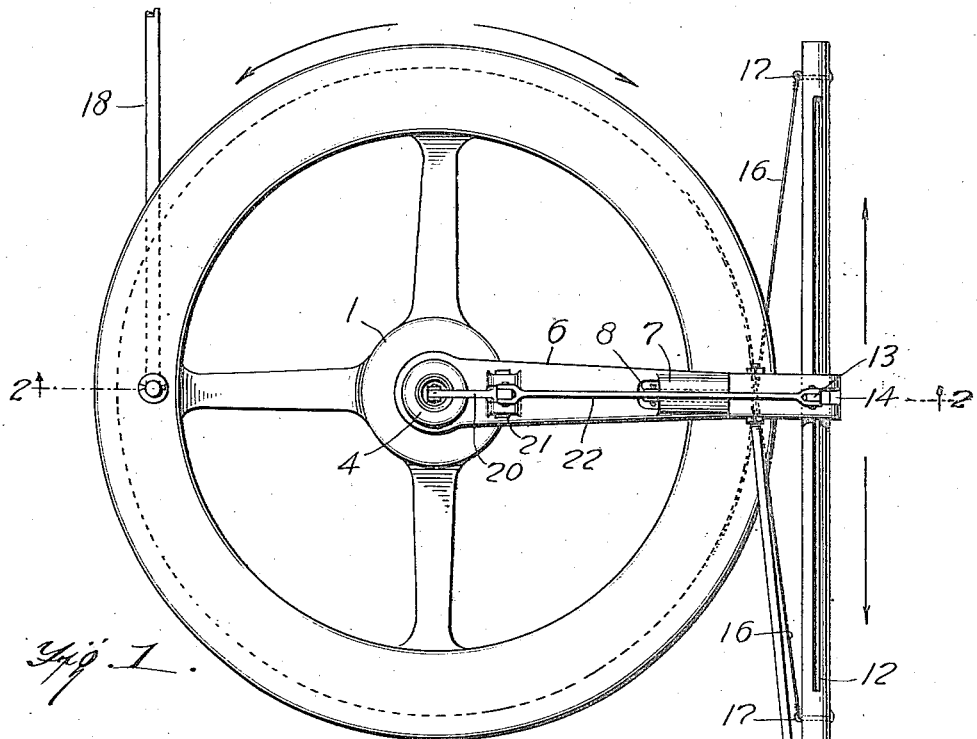
Figure 1 is a top plan view of the improved attachment.
Figure 3:
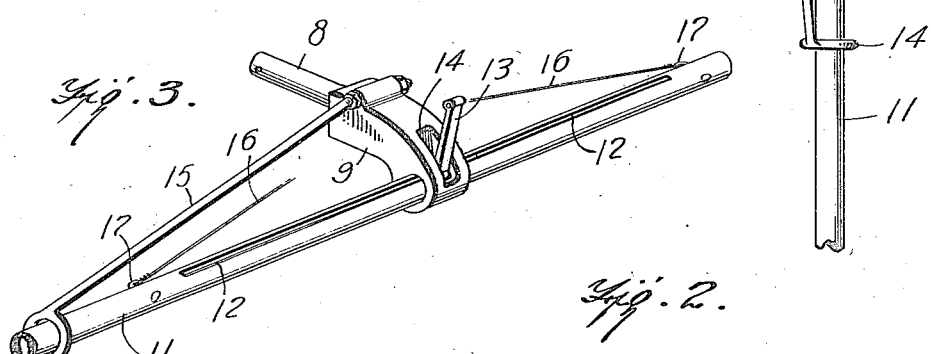
Fig. 3 is a perspective view of the controlling mechanism detached from the wheel.

In the present embodiment of the invention a steering wheel 1 is provided, the said wheel being journaled upon a bushing 2 which is passed through the frame of the tractor, as indicated at 3. This bushing has a marginal flange 4 at its upper end and a nut 5 is threaded onto the lower end to hold the bushing in place.

An arm 6 is journaled onto the bushing above the wheel and between the flange 4 and the wheel, and the outer end of this arm has a bearing 7 radial to the wheel, in which is journaled a pin 8 extending from a casting 9. The pin and casting are held to the arm by a cotter pin 10 which is passed through an opening at the inner end of the journal pin, and it will be evident that the casting may rotate with respect to the arm.

A pipe 11 is mounted in an opening in the outer end of the casting, and it will be noticed that the said casting is arc-shaped, so that the pipe 11 is normally held in about the plane of the wheel. The pipe has a longitudinally extending slot 12, and in this slot moves an arm 13, the said arm having a head fitting within the pipe, so that while the arm may move freely with respect to the pipe it cannot become disengaged therefrom. The arm 13 is held within an opening 14 in the casting, the arrangement being such that the pipe may move freely longitudinally of the arm, but the arm must oscillate with the pipe. The pipe 11 is guided by a guide ring 14 on a bracket arm 15 extending outwardly from the casting 9.

Figure 2:
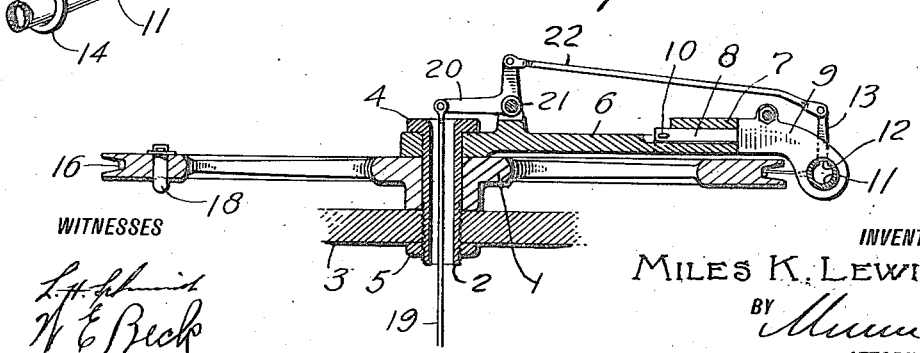
Fig. 2 is a section on the line 2—2 of Fig. 1.

It will be noticed from an inspection of Fig. 2 that the wheel 1 is grooved peripherally, and in this groove is received a wire 16 whose ends are connected to the pipe, as indicated at 17. The wire 16 is given two complete turns about the wheel, the arrangement being such that when the pipe is moved longitudinally the wheel is oscillated, as indicated by the arrows in Fig. 1.

This wheel is connected by means of a link 18 with the steering mechanism of the tractor in such manner that when the wheel is oscillated the tractor will be steered. The engine of the tractor is controlled by a rod 19, which passes upward through the bushing 2 to a connection with one of the arms of a bell crank 20, which is pivoted on the arm 6, as indicated at 21. A link 22 connects the other arm of the bell crank with the arm 13 before-mentioned, the arrangement being such that when the pipe 11 is oscillated, the rod 19 will be moved to control the engine.

In use, the pipe 11 may be oscillated on its axis, moved longitudinally, or swung laterally in either direction. By means of the pipe one may control the tractor from in front or in rear of the same, or alongside the same. When the pipe or shaft is moved longitudinally, the wheel will be oscillated, the direction depending upon the direction of movement of the pipe or shaft. When the said pipe or shaft is oscillated, the engine will be controlled, and the pipe may be swung laterally within limits without affecting the steering wheel.

The oscillation of the pipe or shaft is limited by the engagement of the arm 13 with the ends of the opening 14. The rotation of the casting 9 with respect to the arm 6 is for the purpose of permitting a slight change of vertical relation between the driver and the steering wheel. The pipe 11 swings laterally, this movement being permitted by the cord 16. One end of the cord winds farther upon the wheel while the other end unwinds. The longitudinal movement of the pipe operates the steering wheel to rotate the same.

I claim:

1. A device of the character specified, comprising a bushing supported by the tractor, a steering wheel journaled on the bushing, said wheel being peripherally grooved, a radial arm mounted on the bushing above the wheel and being sectional, the outer section being rotatably connected with the inner section to rotate on an axis radial to the wheel, said outer section having a bearing opening, a pipe or shaft mounted to slide in the opening, a flexible member encircling the wheel in the groove and connected at its ends to the pipe to control the wheel when the pipe is moved longitudinally, a bell crank pivoted on the arm near the bushing, a link connected to one arm of the bell crank and adapted for connection at the other end with the controlling mechanism of an engine and passing through the bushing, an arm slidably connected with the pipe and constrained to rotate therewith and held by the radial arm from movement longitudinally with the pipe, and a connection between the said arm and the bell crank for operating the same when the pipe is oscillated.

2. A device of the character specified, comprising a steering wheel, a radial arm pivoted at the axis of the wheel and being sectional, the outer section being rotatably connected with the inner section to rotate on an axis radial to the wheel, a pipe or shaft journaled in the outer section of the arm and movable longitudinally in the said section, a connection between the wheel and the shaft for oscillating the wheel when the shaft is moved longitudinally, and for permitting the shaft to oscillate with respect to the wheel, and means oscillating with the shaft or pipe and held by the outer section of the arm from movement with the pipe when the pipe is moved longitudinally and adapted to be connected with the engine control for operating the same.

3. A device of the character specified, comprising in combination with the steering wheel, a radial arm pivoted at the axis of the wheel, a shaft slidably connected with the arm at its outer end, a connection between the shaft and the wheel for oscillating the said wheel when the shaft is moved longitudinally and for permitting the shaft to be oscillated without affecting the wheel, and means mounted on the shaft to oscillate therewith and held from movement longitudinally therewith by the arm and adapted for controlling an engine.

4. A device of the character specified, comprising in combination with the steering wheel, a radial arm pivoted at the axis of the wheel, a shaft slidably connected with the arm at its outer end, a connection between the shaft and the wheel for oscillating the said wheel when the shaft is moved longitudinally and for permitting the shaft to be oscillated within limits without affecting the wheel, and means adapted to control an engine controlled by the oscillation of the shaft.

5. A device of the character specified, comprising in combination with the steering wheel, a radial arm pivoted at the axis of the wheel, a shaft slidably connected with the arm at its outer end, and a connection between the shaft and the wheel for oscillating the said wheel when the shaft is moved longitudinally and for permitting the shaft to be oscillated within limits without affecting the wheel.

6. A device of the character specified, comprising in combination with the steering wheel, a shaft for controlling the same, an arm pivoted at the axis of the wheel, the shaft being rotatably mounted in the outer end of the arm, a connection between the shaft and wheel for oscillating the wheel when the shaft is moved longitudinally, said arm being sectional, and the outer section to which the shaft is connected being rotatable with respect to the inner section on an axis radial to the wheel.

7. A device of the character specified, comprising in combination with the steering wheel, a shaft for controlling the same, an arm pivoted at the axis of the wheel, the shaft being rotatably mounted in the outer end of the arm, a connection between the shaft and wheel for oscillating the wheel when the shaft is moved longitudinally, and means adapted to control an engine controlled by the oscillation of the shaft.

8. A device of the character specified, comprising in combination with the steering wheel, a shaft for controlling the same, an arm pivoted at the axis of the wheel, the shaft being rotatably mounted in the outer end of the arm, and a connection between the shaft and wheel for oscillating the wheel when the shaft is moved longitudinally.

9. A device of the character specified, comprising in combination with the steering wheel, a shaft for controlling the same from a distance, said shaft being supported tangentially to the wheel for longitudinal movement, and having a connection with the wheel for rotating the wheel when the shaft is moved longitudinally, said shaft being mounted for oscillation in its support and connected to the control mechanism of the engine for controlling the same when the shaft oscillates.

MILES KARL LEWIS.

Witnesses:
F. J. MILLER,
D. E. TEWEY.